United States Patent
Peng et al.

(10) Patent No.: US 12,081,123 B2
(45) Date of Patent: Sep. 3, 2024

(54) SYSTEM AND METHOD FOR DETECTING A DC BUS VOLTAGE WHILE MINIMIZING POWER LOSS IN STANDBY MODE

(71) Applicant: SIGNIFY HOLDING B.V., Eindhoven (NL)

(72) Inventors: Shaohua Peng, Shanghai (CN); Yuhong Fang, Naperville, IL (US); Bernd Clauberg, Schaumburg, IL (US)

(73) Assignee: SIGNIFY HOLDING, B.V., Eindhoven (NL)

( * ) Notice: Subject to any disclaimer, the term of this patent is extended or adjusted under 35 U.S.C. 154(b) by 192 days.

(21) Appl. No.: 17/626,553

(22) PCT Filed: Jul. 16, 2020

(86) PCT No.: PCT/EP2020/070183
§ 371 (c)(1),
(2) Date: Jan. 12, 2022

(87) PCT Pub. No.: WO2021/013703
PCT Pub. Date: Jan. 28, 2021

(65) Prior Publication Data
US 2022/0247300 A1 Aug. 4, 2022

Related U.S. Application Data

(60) Provisional application No. 62/876,249, filed on Jul. 19, 2019.

(30) Foreign Application Priority Data

Jul. 30, 2019 (EP) .................................... 19188982

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0032* (2021.05); *H02M 1/007* (2021.05);
(Continued)

(58) Field of Classification Search
CPC ............. H02M 1/0032; H02M 1/0003; H02M 1/0025; H02M 3/158; H02M 3/156
See application file for complete search history.

(56) References Cited

U.S. PATENT DOCUMENTS 7,990,070 B2   8/2011 Nerone
8,867,245 B1  10/2014 Hwang
(Continued)

FOREIGN PATENT DOCUMENTS

CN   105429464 A   3/2016
CN   106655769 A   5/2017
(Continued)

*Primary Examiner* — Alex Torres-Rivera

(57) ABSTRACT

An LED power supply, comprising: a power factor correction circuit configured to receive an input signal and provide a DC bus voltage across a DC bus; a converter configured to receive the DC bus voltage and to output a DC output voltage for powering at least one LED, wherein the converter comprises a high-side transistor, wherein the high-side transistor is OFF when the LED power supply is in standby; a voltage sensor being configured to output a voltage sensor output; and a controller configured to receive the voltage sensor output and to output a control signal according to the voltage sensor output, wherein the voltage sensor is positioned in series with the output of the high-side transistor, such that, when the high-side transistor is ON, the voltage sensor output is proportional to the DC bus voltage, and when the transistor is OFF, the voltage sensor is disconnected from the DC bus.

14 Claims, 5 Drawing Sheets

(51) Int. Cl.
    *H05B 45/355*         (2020.01)
    *H05B 45/3725*       (2020.01)
    *H05B 45/385*         (2020.01)

(52) U.S. Cl.
    CPC ....... *H05B 45/355* (2020.01); *H05B 45/3725* (2020.01); *H05B 45/385* (2020.01)

(56) References Cited

U.S. PATENT DOCUMENTS

| | | | |
|---|---|---|---|
| 9,510,401 | B1 | 11/2016 | Kost et al. |
| 9,627,974 | B1* | 4/2017 | Wang .................. H02M 3/1588 |
| 9,966,832 | B1* | 5/2018 | Engelhardt ............ H03K 5/135 |
| 10,178,720 | B1 | 1/2019 | Xiong |
| 10,715,039 | B1* | 7/2020 | Ilango .................. G01R 19/175 |
| 2007/0081370 | A1 | 4/2007 | Chang |
| 2014/0232361 | A1* | 8/2014 | Dally .................... H02M 3/156 |
| | | | 324/705 |
| 2017/0126121 | A1 | 5/2017 | Wang et al. |
| 2017/0311400 | A1* | 10/2017 | Newman, Jr. ........... H02M 1/10 |
| 2019/0182922 | A1 | 6/2019 | Jain |

FOREIGN PATENT DOCUMENTS

| | | | |
|---|---|---|---|
| JP | 2013099110 | A | 5/2013 |
| JP | 2016051651 | A | 4/2016 |
| JP | 2016170834 | A | 9/2016 |
| JP | 2018073742 | A | 5/2018 |

\* cited by examiner

SYSTEM AND METHOD FOR DETECTING A DC BUS VOLTAGE WHILE MINIMIZING POWER LOSS IN STANDBY MODE

CROSS-REFERENCE TO PRIOR APPLICATIONS

This application is the U.S. National Phase application under 35 U.S.C. § 371 of International Application No. PCT/EP2020/070183, filed on Jul. 16, 2020, which claims the benefit of U.S. Provisional Patent Application No. 62/876,249, filed on Jul. 19, 2019, and European Patent Application No. 19188982.3, filed on Jul. 30, 2019. These applications are hereby incorporated by reference herein.

FIELD OF THE DISCLOSURE

The following relates to systems and method for determining a voltage of DC bus in an LED power supply, and, specifically, to determining a voltage of a DC bus in an LED power supply with a voltage sensor that does not consume power while the LED power supply is in standby.

BACKGROUND

FIG. 1 depicts a block diagram of a typical LED power supply 100, which comprises an EMI filter 102, a Power Factor Correction (PFC) circuit 104, a PFC controller 106, a converter 108, an output stage 110, a controller 112, a second converter 114 and a control interface 116.

When the LED power supply 100 is operating in standby mode, converter 108 is OFF so that there is no output to the LEDs. PFC circuit 104 is also OFF during standby to reduce power consumption. Converter 114, however, is generally ON to preserve functioning of the control interface (e.g., to receive an ON command that draws LED power supply 100 out of standby) and/or to power an external control device. Likewise, controller 112 must remain in operation, or, otherwise, the converter 108 may not be restarted.

Even when LED power supply 100 is operating in standby mode, and thus PFC circuit 104 and converter 108 are OFF, the DC bus 118, which connects the PFC circuit 104 to converter 108, is normally at the peak of the input line voltage. For example, when the input voltage is 277V, the DC bus 118 may be at 392 V DC. Voltage sensors 120, 122 detect this peak voltage at the DC bus 118 and communicate a proportional voltage to PFC controller 106 and controller 112, respectively.

Because voltage sensors 120, 122—which comprise resistors R1, R2 and R4, R5, and R6, respectively—are drawing current to detect the DC bus 118 voltage, voltage sensors 120, 122 will consume power during standby. For example, given a 277 V input voltage, voltage sensor 122 may draw 150 µA, resulting in the dissipation of 59 mW of power. Given standby requirement of, for example, less than 250 mW, the power consumed by voltage sensor 120, alone, is substantial. If the input voltage is 480 V, the power loss in the resistor increases to 102 mW. If additional resistors are used in voltage sensor 120, the power consumption by the voltage sensor 122 may increase. Additionally, if the power dissipated by voltage sensor 122 is included, a major portion of the power during standby is consumed by the voltage sensors 120, 122 alone.

As shown in FIG. 2, a high voltage FET 123 may be positioned disconnect voltage sensors 120, 122 (which, in FIG. 2, have been joined together into a single string) when LED power supply 100 is in standby mode. This arrangement would prevent the voltage sensors 120, 122 from consuming power during standby but has a number of disadvantages. First, the arrangement of FIG. 2 requires an additional high-voltage FET 123, which is a relatively expensive component. Second, the arrangement of FIG. 2 requires an additional signal to drive high-voltage FET 123, which requires an additional output from the controllers (e.g., controller 112) adding another level of complexity.

Accordingly, there exists a need in the art to detect the voltage of a DC bus in an LED power supply, while minimizing power consumption of the voltage sensor while the LED power supply is in standby.

SUMMARY OF THE DISCLOSURE

Various examples disclosed herein describe a system and method for detecting the voltage of a DC bus, while minimizing power consumption of the voltage sensor while the LED power supply is in standby. In one example, the voltage sensor may be positioned in series with the output of a high-side transistor of a DC-DC converter, such that the voltage sensor outputs a voltage proportional to the DC bus voltage while the high-side transistor is ON, and is disconnected from the DC bus when the high-side transistor is OFF.

According to an aspect, an LED power supply, includes a power factor correction circuit configured to receive an input signal and provide a DC bus voltage across a DC bus; a converter configured to receive the DC bus voltage and to output a DC output voltage for powering at least one LED, wherein the converter comprises a high-side transistor, wherein the high-side transistor is OFF when the LED power supply is in standby; a voltage sensor being configured to output a voltage sensor output; and a controller configured to receive the voltage sensor output and to output a control signal according to the voltage sensor output, wherein the voltage sensor is positioned in series with the output of the high-side transistor, such that, when the high-side transistor is ON, the voltage sensor output is proportional to the DC bus voltage, and when the high-side transistor is OFF, the voltage sensor is disconnected from the DC bus.

In an example, the LED power supply further includes a peak detector disposed such that the voltage sensor output is proportional to a peak of the DC bus voltage.

In an example, the peak detector is disposed at the output of the high-side transistor.

In an example, the peak detector is disposed at the output of the voltage sensor.

In an example, the controller is configured to average the voltage sensor output.

In an example, the controller is configured to sample the voltage sensor output only when the high-side transistor is ON.

In an example, the controller is configured to output the control signal to the power factor correction circuit according to the voltage sensor output.

In an example, the controller is configured to output the control signal to the converter according to the voltage sensor output.

In an example, the converter is one of: a half-bridge converter, a full-bridge converter, a buck converter, a two-switch flyback converter, or a two-switch forward converter.

In an example, the voltage sensor output of the voltage sensor is a current proportional to the DC bus voltage when the high-side transistor is ON, wherein the controller is configured to determine the DC bus voltage according to the current of the voltage sensor output.

In an example, voltage sensor output is a voltage proportional to the DC bus voltage when the high-side transistor is ON, wherein the controller 112 is configured to determine the DC bus voltage according to the voltage sensor output.

In an example, the voltage sensor is a voltage divider.

In an example, the LED power supply further includes a second voltage sensor being configured to output a second voltage sensor output; and a second controller configured to receive the second voltage sensor output and to output a second control signal according to the second voltage sensor output, wherein the second voltage sensor is positioned in series with the output of the high-side transistor, such that, when the high-side transistor is ON, the second voltage sensor output is proportional to the DC bus voltage, and when the high-side transistor is OFF, the second voltage sensor is disconnected from the DC bus.

According to another aspect, a method for sensing a DC bus in an LED power supply, includes the steps of: providing a power factor correction circuit configured to receive an input signal and provide a DC bus voltage across a DC bus, a converter configured to receive the DC bus voltage and to output a DC output voltage for powering at least one LED, wherein the converter comprises a high-side transistor, wherein the high-side transistor is OFF when the LED power supply is in standby, a voltage sensor being configured to output a voltage sensor output, wherein the voltage sensor is positioned in series with the output of the high-side transistor, such that, when the high-side transistor is ON, the voltage sensor output is proportional to the DC bus voltage, and when the transistor is OFF, the voltage sensor is disconnected from the DC bus; detecting, with a controller, the voltage sensor output; and outputting, with the controller, a control signal according to the voltage sensor output.

In an example, the method further includes the step of providing a peak detector disposed such that the voltage sensor output is proportional to a peak of the DC bus voltage.

In an example, the controller is configured to detect the voltage sensor output only when the high-side transistor is ON.

In an example, the control signal is output to the power factor correction circuit.

In an example, the control signal is output to the converter.

In an example, the voltage sensor output of the voltage sensor is a current proportional to the DC bus voltage when the high-side transistor is ON, wherein the controller is configured to determine the DC bus voltage according to the current of the voltage sensor output.

In an example, voltage sensor output is a voltage proportional to the DC bus voltage when the high-side transistor is ON, wherein the controller 112 is configured to determine the DC bus voltage according to the voltage sensor output.

In an example, the voltage sensor is a voltage divider.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION OF EMBODIMENTS

Various examples described herein are directed toward an LED power supply with a voltage sensor advantageously positioned in series with a high-side transistor of a converter, in order to detect the DC bus voltage but consume no power when the LED power supply is in standby.

Figure 3:
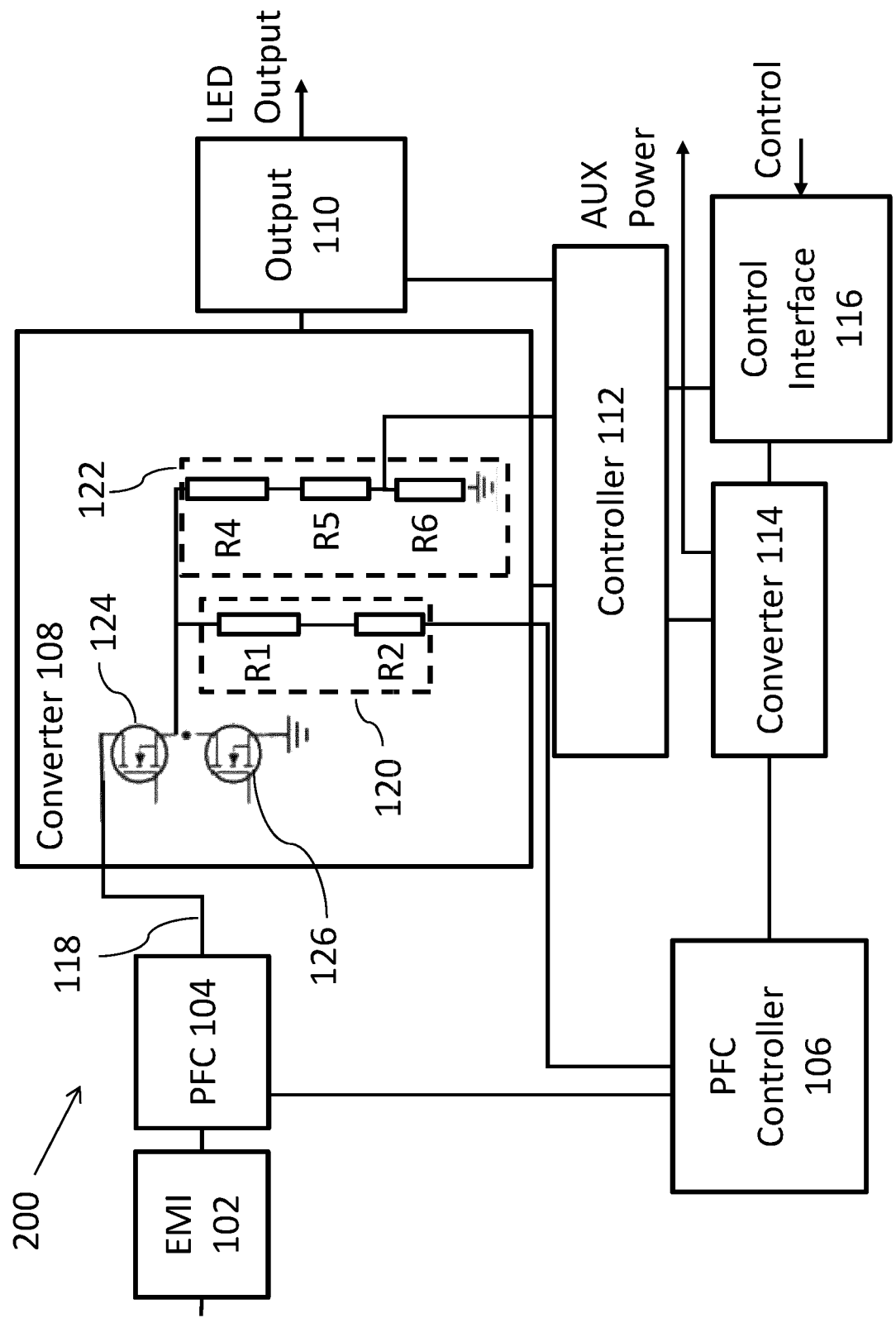
FIG. 3 depicts an LED power supply employing a voltage sensor at the output of the high-side transistor of a converter, according to an example.

Turning now to FIG. 3, there is shown an LED power supply 200 which comprises an EMI filter 102, a PFC circuit 104, PFC controller 106, a converter 108, an output stage 110, controller 112, second converter 114 and control interface 116. LED power supply will typically receive an input as AC mains voltage. LED power supply 200 may be configured enter a standby mode, in which at least PFC controller 106 and converter 108 are switched OFF, and the LED power supply 200 ceases to output the LED Output.

Generally speaking, EMI filter 102 filters noise from the AC mains voltage. PFC circuit 104 largely functions to convert the input voltage to a DC signal with low harmonic distortion. PFC circuit 104 may, for example, be any suitable circuit for performing the power-factor control, including, for example, buck or boost PFC circuit, although other PFC circuits are known and may be used herein. PFC circuit outputs the DC voltage across DC bus 118 to converter 108, where it is downconverter to a lower DC voltage that may be used by output stage 110 to produce the output for driving the LEDs. PFC controller 106 generally functions to operate PFC circuit 104 by, for example, outputting a signal to drive transistor disposed within PFC circuit 104. PFC controller 106 may also, for example, be powered by converter 114, which also supplies power to the control interface 116 for the LED power supply (the control interface 116 may receive a Control Input) and to an auxiliary power output AUX Power for powering an external device, such as an external controller. Controller 112 may be configured to control the operation of converter 108 (e.g., the operation of high-side transistor 124 and low-side transistor 126, as will be described below) by outputting a control signal. Controller 112 may also be configured to receive input commands from control interface 116 and to sense output stage 110 for generating the LED Output signal.

PFC controller 106 and controller 112 each may be implemented as, for example, microcontrollers. However, in alternate examples, PFC controller 106 and controller 112 may each be implemented in combination with any necessary hardware or firmware. In an example PFC controller 106 and controller 112 may each be implemented by a single or by multiple microcontrollers. Indeed, individual functions of the PFC controller 106 or controller 112 may be implemented by one or more controllers acting in concert.

The voltage sensors 120, 122, as will be described below, are positioned to sense the voltage of DC bus 118 and to provide a voltage sensor output signal that is proportional to the voltage of the DC bus 118 to PFC controller 106 and controller 112. Accordingly, voltage sensors 120, 122, may be comprised of resistors, such as resistors R1 and R2, and resistors R4, R5, and R6, although it should be understood that other configurations of resistors and other types of voltage sensors may be used in alternate examples. The output of voltage sensor 120 will be at the output of R2, while the output of voltage sensor 122, being a voltage divider, will be the connection of resistors R5 and R6. The output of voltage sensor 120 is a current that will be proportional to the DC bus voltage. PFC controller 106 detects the current output from voltage sensor 120 and, from it, may determine a value representative of the DC bus voltage. The output of voltage sensor 122 is a voltage proportional to DC bus voltage, which is detected at controller 112. Generally speaking, the output of voltage sensors 120, 122 form feedback signals that are provided to PFC controller 106 and controller 112.

PFC controller 106 may, according the feedback signal received from voltage sensor 120, generate a control signal to PFC circuit 104 to control the operation of PFC circuit 104 (e.g., the control signal may be drive a transistor disposed within PFC circuit 104). Similarly, controller 112 may control the operation of the converter 108 according to the voltage sensor output signal received from voltage sensor 122. For example, as mentioned above, the controller 112 may be configured to generate a control signal for controlling a high-side transistor 124 or low-side transistor 126 according to the voltage sensor output signal received from sensor 122. The value of the resistors may be set such that the input to the PFC controller 106 and controller 112 does not exceed the maximum allowable input of either controller.

Figure 4:
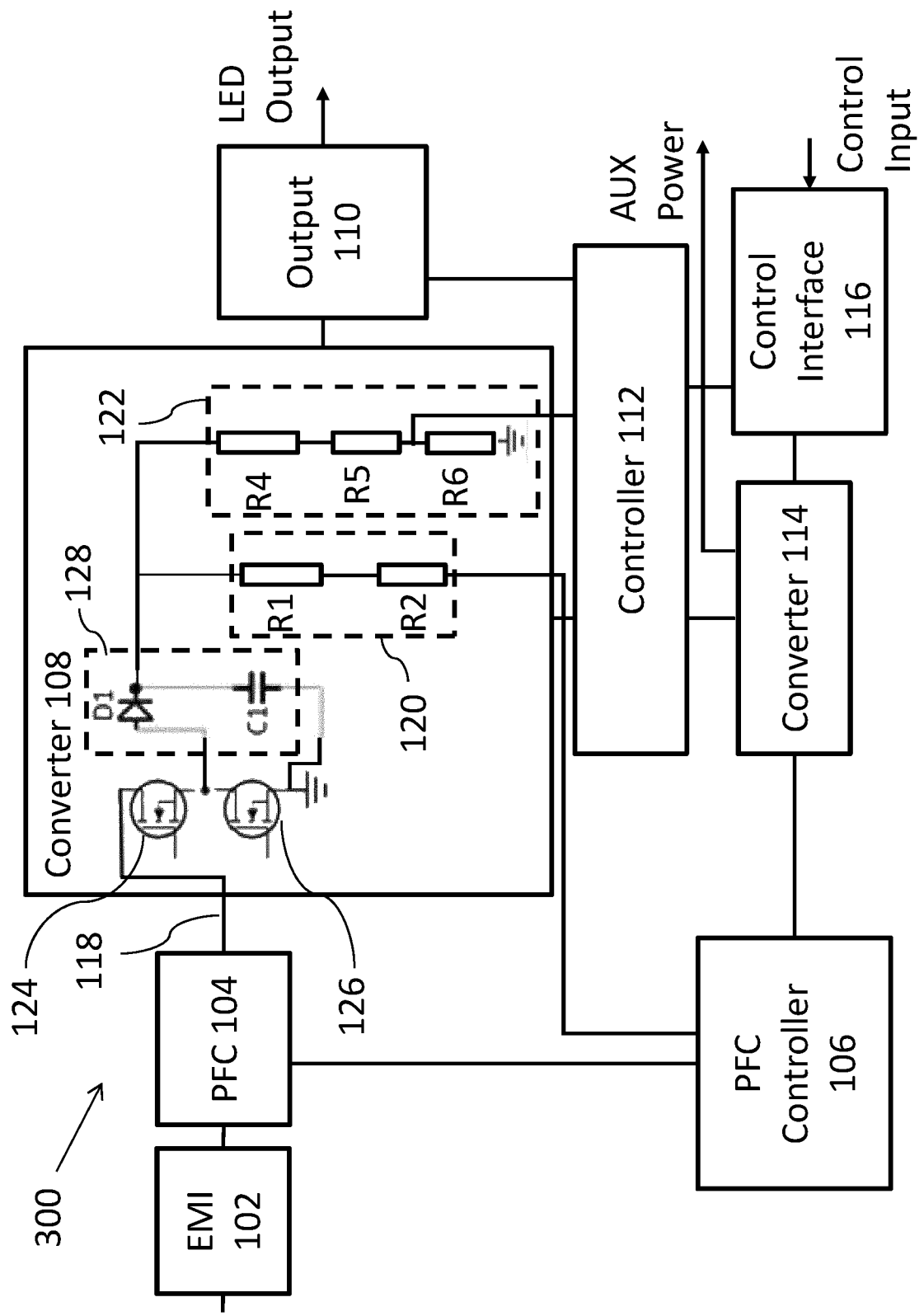
FIG. 4 depicts an LED power supply employing a voltage sensor at the output of the high-side transistor of a converter, together with a peak detector, according to an example.

Converter 108 may be, for example, any DC-DC converter utilizing a high-side transistor, such as a half-bridge converter, a full-bridge converter, a buck converter, a two-switch flyback converter, or a two-switch forward converter. In such a converter, the high-side transistor is tied to the DC bus voltage and generally functions as part of the DC-DC converting operation of convert 108 (that is, the high-side transistor is employed, at least in part, to convert the DC input voltage to a lower DC output voltage). When the converter is in operation, the high-side transistor will, for at least a period of time, be ON, such that its output is substantially similar to the DC bus 118 voltage to which it is connected (here, "substantially similar" takes into consideration the minimal losses inherent to the operation of the high-side transistor). In the example of FIGS. 3 and 4, converter 108 is a half-bridge converter, including a high-side transistor 124 and a low-side transistor 126. During operation of the half-bridge converter, the high-side transistor 124 will generally operate to output a square wave having a 50% duty cycle. The voltage of the square wave, when the high-side transistor 124 is ON, will be substantially similar DC Bus 118 voltage.

Voltage sensors 120, 122 may be thus be connected in series with the output of the high-side transistor 124 of converter 108. For example, as shown in FIG. 3, the voltage sensors 120, 122 are in series with the output of high-side transistor 124, such that the output of the voltage sensors 120, 122 will be proportional to the voltage of the DC bus 118 when the high-side transistor 124 is ON. PFC controller 106, and controller 112 will, accordingly, receive a voltage proportional to the voltage of the DC bus 118 from voltage sensors 120, 122, respectively, while the high-side transistor is ON. However, when the LED power supply 200 is in standby, the high-side transistor 124 is OFF, and thus the voltage sensor 120, 122 will be disconnected from the DC bus 118, and will, accordingly, cease consuming power. Disposing voltage sensors 120, 122 at the output of high-side transistor 124 advantageously uses the existing function and topology of converter 108 in order to disconnect the voltage sensors 120, 122 from the DC bus 118 during standby.

While the converter 108 is operating, high-side transistor 124 will be periodically ON. For example, as mentioned above, converter 108 may output a square wave having a 50% duty cycle. In that example, high-side transistor 124 will be ON for 50% of the time during operation of converter 108. PFC controller 106 and controller 112 may thus be configured to average the output of voltage sensors 120, 122, in order to account for the time that high-side transistor 124 is OFF. Because an average of the output of high-side transistor 124, for 50% duty cycle, will be proportionally half the value of the DC bus 118 voltage, the voltage sensors 120, 122 may be configured to increase their outputs accordingly. For example, the resistance of resistor R6 may be doubled, in order to double the magnitude of the output of voltage sensor 122.

Alternatively, controller 112 and PFC controller 106 may be configured to sample the voltage sensor 120, 122 when only when the high-side transistor 124 is ON. For example controller 112 and PFC controller 106 may be configured to only sample the output of voltage sensor 120, 122 when it is a non-zero value.

Because most existing microcontrollers are configured to receive a continuous input, and do not necessarily include functions to average the input or to operate only when the input is non-zero, a peak detector 128 may be employed, in order to maintain the output of voltage sensors 120, 122 at a value proportional to the peak of DC bus 118 voltage, while converter 108 is operational. Such an example is shown in FIG. 4, which depicts LED power supply 300. The components, with the exception of peak detector 128, are described in connection with FIG. 3 and thus will not be described further.

As shown, peak detector 128 may be positioned in series with the output of high-side transistor 124, in order to maintain the input to voltage sensors 120, 122 at a value substantial equal to the peak value of the DC bus voltage (taking into consideration losses of high-side transistor 124 and diode D1). Thus, the output of voltage sensors 120, 122 will be proportional to the peak of the DC bus 118 voltage when high-side transistor 124 is ON and converter 108 is operating. Alternatively, peak detector 128 may be positioned at one or both of the outputs of voltage sensors 120, 122, in order to maintain the output of the voltage sensors 120, 122 (e.g., between the output of voltage sensors 120, 122 and the input to PFC controller 106 and controller 112, respectively) at the value proportional to the peak value of DC bus 118 voltage. For example, peak detector 128 may be placed in parallel with resistor R6 of voltage sensor 122. Peak detector 128, as shown, may comprise diode D1 and capacitor C1. Other peak detectors, however, are known in the art and may be substituted as suitable.

As mentioned above, it should also be understood that LED power supplies 200, 300 are merely provided as examples, and that the systems and methods described herein may be used in conjunction with any LED power supply utilizing a converter having a high-side transistor to which the voltage sensors may be connected, such that the voltage sensor is disconnected from the DC bus when the LED power supply is in standby.

Figure 1:
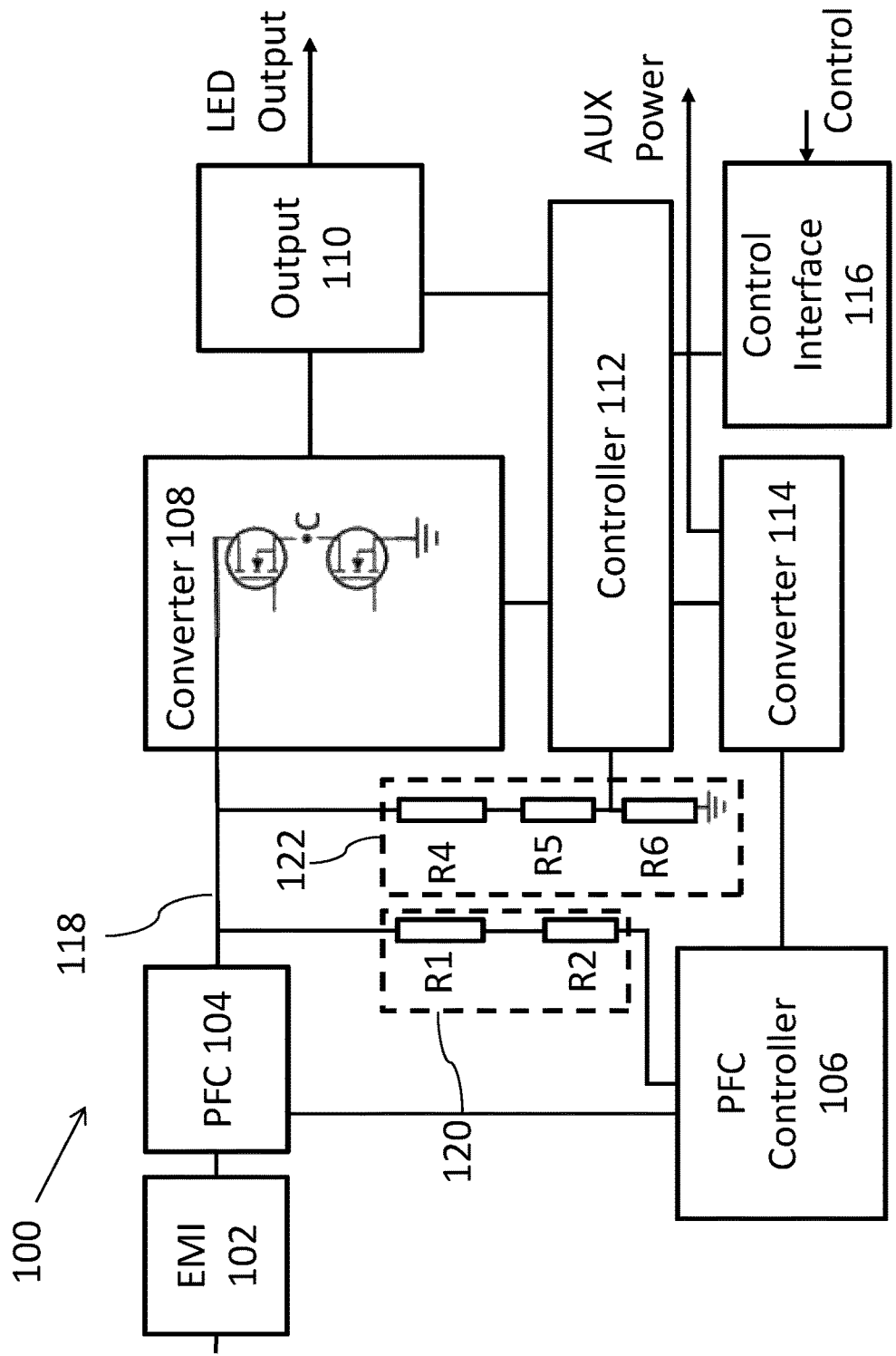
FIG. 1 depicts an LED power supply.
Figure 2:
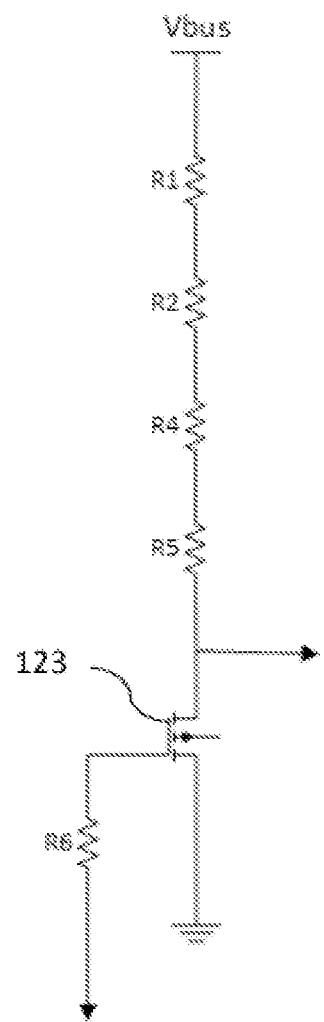
FIG. 2 depicts a partial schematic of a voltage sensor and a high-voltage FET positioned to prevent the voltage sensor from consuming power, according to an example.

It should also be understood that, although two voltage sensors 120, 122, are shown in FIGS. 2 and 3, in alternative examples, only one of voltage sensor 120 or voltage sensor 122 may be implemented. For example, in an alternative example, only voltage sensor 120 is used. Furthermore additional voltage sensors, besides voltage sensor 120 or voltage 122, may be implemented, depending on the needs of the particular LED power supply in which the voltage sensors are used. For example, in alternative embodiments, additional controllers may be implemented that require additional voltage inputs, each controller receiving a separate voltage detection input from a respective additional voltage sensor. Additionally, it is not necessary that each voltage sensor provide only one output to one controller. Indeed, as shown in FIG. 2, voltage sensors 120, 122 may be combined into a single string which provides outputs to multiple controllers (e.g., PFC controller 106 and controller 112).

Figure 5:
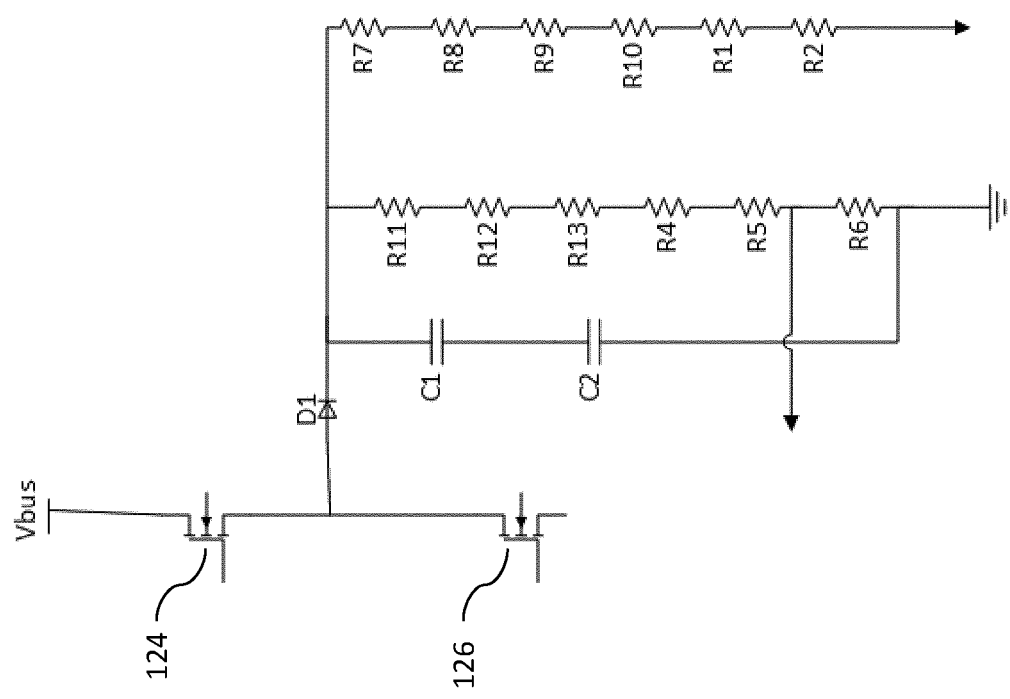
FIG. 5 depicts a partial schematic of a plurality of voltage sensors connected at the output of a high-side transistor of a converter, together with a peak detector, according to an example.

In addition, each voltage sensor need not be configured exactly as shown in FIGS. 2 and 3. For example, an alternative example of voltage sensors 120, 122, is shown in FIG. 5. As shown, voltage sensor 120 and 122 each comprise six resistors, rather than two. The number and value of the resistors used in the voltage sensors will depend on the magnitude of the voltage at the input of the voltage sensor (e.g., the value of Vbus) and the input parameters of the controller or other component for which the voltage sensor supply the sensed voltage.

For example, resistors R7, R8, R9, and R10 may each have a value of of 1 MOhm, while resistors R1 and R2 have a value of 680 KOhm and 220 KOHm, respectively, to condition the current which is sensed at the PFC controller 106. The current through voltage sensor 120, sensed at PFC controller 106, is converted to a voltage to measure the VBUS voltage. Similarly, resistors, R11, R12, R13, and R4 may each have a value of 1 MOhm, while resistors R5, and R6 may have values of 10K and 8K, respectively, condition the value of the voltage received at controller 112 according to the value of the Vbus voltage and the input requirements of controller 112.

As disclosed herein, the ideas described in connection with the description LED power supply 200, 300 advantageously position voltage sensors to detect the DC bus voltage, but consume no power when the LED power supply is in standby. Additionally, no additional expensive components, such as high-voltage FETs, are required to implement such low-power voltage sensing; rather, the voltage sensor is advantageously disconnected from the DC bus using the existing topology of the converter.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. An LED power supply, comprising:
   a power factor correction circuit configured to receive an input signal and provide a DC bus voltage across a DC bus;
   a converter configured to receive the DC bus voltage and to output a DC output voltage for powering at least one LED, wherein the converter comprises a high-side transistor, wherein the high-side transistor is OFF when the LED power supply is in standby;
   a voltage sensor being configured to output a voltage sensor output;
   a controller configured to receive the voltage sensor output and to output a control signal according to the voltage sensor output, wherein the voltage sensor is positioned in series with the output of the high-side transistor of the converter, such that, when the high-side transistor is ON, the voltage sensor output is proportional to the DC bus voltage, and when the high-side transistor is OFF, the voltage sensor is disconnected from the DC bus; a peak detector disposed such that the voltage sensor output is proportional to a peak of the DC bus voltage; and, wherein the peak detector is disposed between the output of the high-side transistor of the converter and the voltage sensor;

a second voltage sensor being configured to output a second voltage sensor output; and a second controller configured to receive the second voltage sensor output and to output a second control signal according to the second voltage sensor output, wherein the second voltage sensor is positioned in series with the output of the high-side transistor, such that, when the high-side transistor is ON, the second voltage sensor output is proportional to the DC bus voltage, and when the high-side transistor is OFF, the second voltage sensor is disconnected from the DC bus.

2. The LED power supply of claim 1, wherein the peak detector includes a diode and capacitor.

3. The LED power supply of claim 1, wherein the controller is configured to average the voltage sensor output.

4. The LED power supply (100) of claim 1, wherein the controller is configured to sample the voltage sensor output only when the high-side transistor is ON.

5. The LED power supply of claim 1, wherein the controller is configured to output the control signal to the power factor correction circuit according to the voltage sensor output.

6. The LED power supply of claim 1, wherein the controller is configured to output the control signal to the converter according to the voltage sensor output.

7. The LED power supply of claim 1, wherein the converter is one of: a half-bridge converter, a full-bridge converter, a buck converter, a two-switch flyback converter, or a two-switch forward converter.

8. The LED power supply of claim 1, wherein the voltage sensor output of the voltage sensor is a current proportional to the DC bus voltage when the high-side transistor is ON, wherein the controller is configured to determine the DC bus voltage according to the current of the voltage sensor output.

9. The LED power supply of claim 1, wherein the voltage sensor output is a voltage proportional to the DC bus voltage when the high-side transistor is ON, wherein the controller is configured to determine the DC bus voltage according to the voltage sensor output.

10. The LED power supply of claim 9, wherein the voltage sensor is a voltage divider.

11. A method for sensing a DC bus in an LED power supply, comprising the steps of:

providing a power factor correction circuit configured to receive an input signal and provide a DC bus voltage across a DC bus, a converter configured to receive the DC bus voltage and to output a DC output voltage for powering at least one LED, wherein the converter comprises a high-side transistor, wherein the high-side transistor is OFF when the LED power supply is in standby, a voltage sensor being configured to output a voltage sensor output, wherein the voltage sensor is positioned in series with the output of the high-side transistor, such that, when the high-side transistor is ON, the voltage sensor output is proportional to the DC bus voltage, and when the transistor is OFF, the voltage sensor is disconnected from the DC bus;

detecting, with a controller, the voltage sensor output;

outputting, with the controller, a control signal according to the voltage sensor output; providing a peak detector disposed between the output of the high-side transistor of the converter and the voltage sensor, such that the voltage sensor output is proportional to a peak of the DC bus voltage; and wherein the controller is configured to detect the voltage sensor output only when the high-side transistor of the converter is ON; and outputting, by a second controller configured to receive a second voltage sensor output, a second control signal according to the second voltage sensor output, wherein the second voltage sensor is positioned in series with the output of the high-side transistor, such that, when the high-side transistor is ON, the second voltage sensor output is proportional to the DC bus voltage, and when the high-side transistor is OFF, the second voltage sensor is disconnected from the DC bus.

12. The method of claim 11, wherein the control signal is output to the power factor correction circuit.

13. The method of claim 11, wherein the control signal is output to the converter.

14. The method of claim 11, wherein the voltage sensor output of the voltage sensor is a current proportional to the DC bus voltage when the high-side transistor is ON, wherein the controller is configured to determine the DC bus voltage according to the current of the voltage sensor output.

* * * * *